Aug. 19, 1958      E. L. BARCUS      2,848,573
DIRECTION SIGNAL SWITCH MECHANISM
Filed Aug. 31, 1954      2 Sheets—Sheet 1
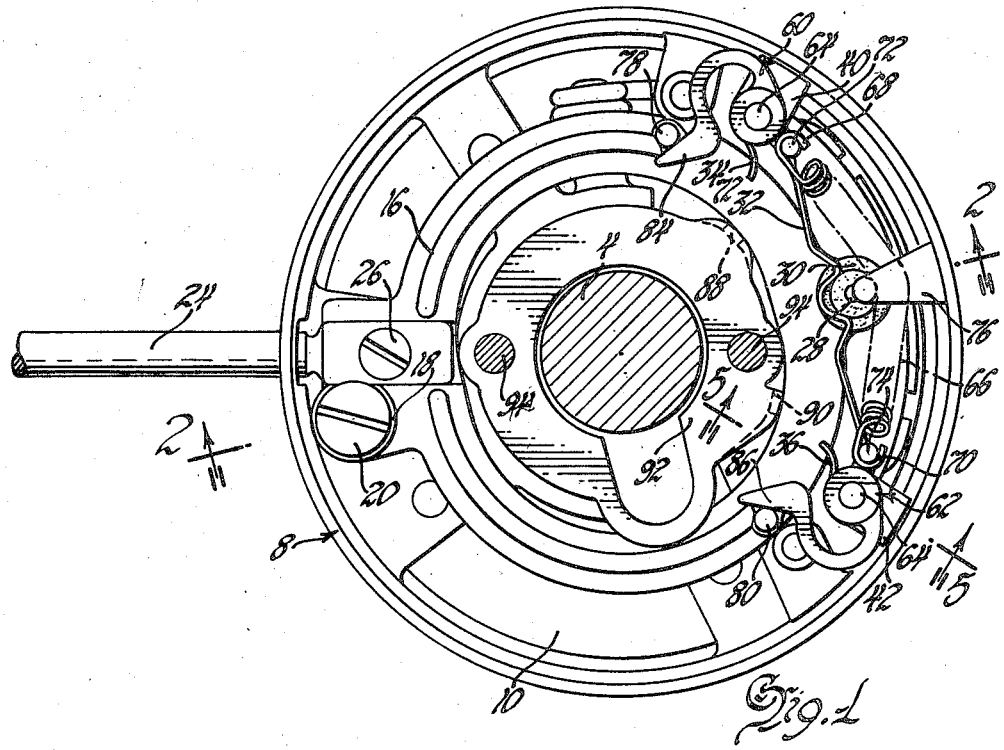
INVENTOR
Edward L. Barcus
BY
Paul Fitzpatrick
ATTORNEY Aug. 19, 1958　　　E. L. BARCUS　　　2,848,573
DIRECTION SIGNAL SWITCH MECHANISM Filed Aug. 31, 1954　　　2 Sheets-Sheet 2

INVENTOR
Edward L. Barcus
BY
Paul Fitzpatrick
ATTORNEY

United States Patent Office 2,848,573
Patented Aug. 19, 1958

2,848,573

DIRECTION SIGNAL SWITCH MECHANISM

Edward L. Barcus, Anderson, Ind., assignor to General Motors Corporation, Detroit, Mich., a corporation of Delaware Application August 31, 1954, Serial No. 453,404

9 Claims. (Cl. 200—61.34)

This invention relates to direction signal switch mechanisms and more particularly to switch mechanisms of the type which are manually set and automatically reset.

An object of the invention is to provide a direction signal switch mechanism adapted for disposition in concentric relation with the steering column of a motor vehicle.

Another object is to provide in a direction signal switch mechanism automatic cancelling means which may be overridden when the mechanism becomes obstructed or is manually restrained.

A further object is to provide a direction signal switch mechanism having a pair of pivotal pawls mounted in fixed locations and an operating ring swingable to temporarily displace one or the other of the pawls to a position engageable by a cancelling projection carried by the steering wheel.

A still further object is to provide a device of the stated character which is simple in construction, efficient in operation and requires a minimum of parts.

These and other objects and advantages of the invention will become more fully apparent as reference is had to the accompanying specification and drawings wherein:

Fig. 1 is a plan view, partly in section, showing the construction and arrangement of the various parts, the mechanism being shown in the neutral position.

Fig. 2 is a fragmentary elevational view, partly in section, looking in the direction of arrows 2—2 of Fig. 1.

Figure 3:
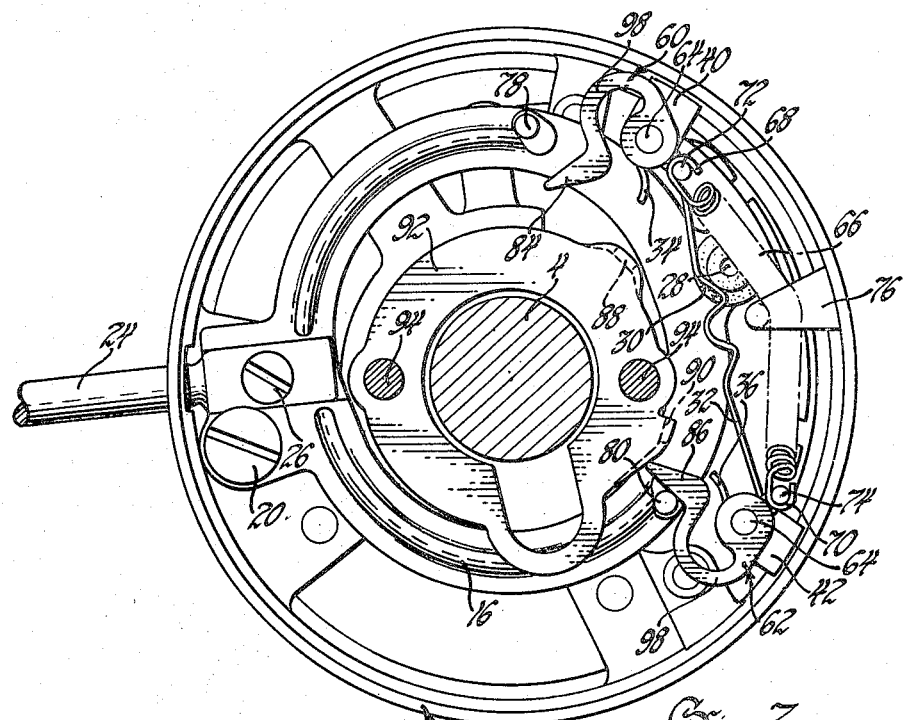
Fig. 3 is a view similar to Fig. 1, showing the position of the parts when the mechanism is in a left turn signal operating position.

Referring now to the drawings and particularly Figs. 1 and 2, there is illustrated a portion of the hub of a vehicle steering wheel 2 which is secured at the upper end of a steering shaft 4. Surrounding shaft 4 in concentric relation is a steering column or jacket 6, the upper end of which terminates slightly below the base of steering wheel hub 2. A generally cylindrical direction signal switch housing 8 is disposed in concentric relation with and directly below hub 2. Housing 8 is provided with a web portion 10 having a central downwardly extending pilot portion 12 which is slidably received in the upper end of steering column 6 and secured therein against rotation by keying or other suitable means. A second housing 14 is secured below housing 8 on column 6 and tapers progressively downwardly and inwardly to blend with the column 6.

Disposed interiorly of housing 8 in generally concentric relation therewith is a switch operating ring 16. At one side thereof, ring 16 is formed with an integral vertically extending hub portion 18 through which extends a relatively long threaded pivot stud 20. The lower end of stud 20 threadably engages a tapped aperture 22 formed in the web 10 of housing 8. Slightly to one side of hub 18, an operating lever 24 is secured to the ring 16 by means of machine screws 26. Lever 24 extends outwardly through an elongated aperture formed in the cylindrical wall of housing 8 to permit manual adjustment of the ring 16 to its various positions of adjustment.

Generally opposite pivot stud 20, ring 16 is provided with an upstanding projection 28 on which is journalled a flanged nylon detent roller 30. Roller 30 is adapted for rolling engagement with a transversely extending blade spring 32 having an undulating midportion defining a central neutral position and switch operating positions at either side of the neutral position. The opposite ends of spring 32 are provided with semi-closed loops 34 and 36 which surround cylindrical portions 38 of bosses 40 and 42. Bosses 40 and 42 are formed integrally with and extend laterally inwardly of the cylindrical wall of housing 8. It will be apparent that the undulating midportion of spring 32 will flex inwardly responsive to swinging movement of ring 16 in either direction and return flexibly outwardly to yieldably retain the ring in any of the aforementioned positions.

Below ring 16 and in general vertical alignment with nylon roller 30, an electrical switch 44 is secured in a recess in housing 8. A depending stud 46 formed integrally on ring 16 extends through an opening 48 in the casing 50 of switch 44 and engages an insulated block 52 which is slidably disposed within the casing. Block 52 is provided with suitable bridging contact members 54 which are adapted to engage the switch terminals 56 embedded in the insulated base 58 of switch 44. Since the precise construction of switch 44 forms no part of the invention, a detailed description thereof will be omitted. It will be understood, however, that bridging contacts 54 of switch terminals 56 are disposed in a manner causing the direction signalling lamp, not shown, to be energized and de-energized in accordance with the setting of the switch operating ring 16.

In order to accomplish automatic resetting of ring 16 to neutral position from either of its switch operating positions, a pair of reversely similar molded nylon pawls 60 and 62 are rotatably mounted on vertically extending pins 64. Pins 64 are integral with and extend upwardly from cylindrical portions 38 of bosses 40 and 42, respectively. A coil spring 66 extends transversely across housing 8 and is provided with opposite looped ends 68 and 70 which engage offset upstanding arms 72 and 74 formed integrally on pawls 60 and 62. An integral hooked finger 76 formed on housing 8 engages the midportion of spring 66 and maintains the midportion of the spring outwardly from the central portion of the housing. It will be apparent that the tension of spring 66 will rotatively urge the pawls 60 and 62 respectively clockwise and counter-clockwise. A pair of upstanding integral pins 78 and 80 formed on ring 16 adjacent the tapered or wedge-shaped ends 84 and 86 of pawls 60 and 62 serve to limit the respective clockwise and counterclockwise rotation of the pawls so that when ring 16 is in the neutral position, both tapered tips 84 and 86 extend at angles clearing the circular path defined by depending cancelling fingers 88 and 90 carried on the lower surface of steering wheel hub 2. Fingers 88 and 90 are formed on a circular plate 92 which is secured to hub 2 by means of machine screws 94.

As seen best in Fig. 3, when lever 24 is swung downwardly to the left turn indicating position, ring 16 swings upwardly about pivot 20. Since upstanding pins 78 and 80 are carried by ring 16, pin 78 moves arcuately outwardly away from the wedge-shaped portion 84 of pawl 60 and, therefore, does not disturb the position assumed by pawl 60 as a result of tension of spring 66. However, pin 80 is carried arcuately inwardly and rotatively urges pawl 62 to swing clockwise against the resistance of spring 66. As pawl 62 swings clockwise, the wedge-shaped tip 86 moves to a position intersecting the circular path of the cancelling fingers 88 and 90, previously mentioned. Upon rotation of the steering wheel in a counter-clockwise or left turn direction, cancelling fingers 88 and 90 rotate counterclockwise therewith. Consequently, the fingers approach and engage the wedge-shaped portion 86 of pawl 62 from the left side thereof. As rotation of the fingers continues, the pawl 62 is rotatively urged still further in a clockwise direction against the resistance of spring 66 until the wedge-shaped portion clears the path of the cancelling fingers whereupon the pawl returns to the position shown in Fig. 3 in response to the tension of spring 66. This ratchet action continues as the cancelling fingers successively pass the wedge-shaped tip 86 in a counter-clockwise direction. Upon reversal of rotation of the steering wheel to return the vehicle to the straight ahead position, the cancelling fingers 88 and 90 approach and engage the wedge-shaped portion 86 from the right side thereof. Since counterclockwise rotation of the pawl 62 is resisted by the upstanding pin 80 on ring 16, continued clockwise rotation of cancelling fingers 88 and 90 cause the wedge-shaped portion 86 to cam the ring 16 to the neutral position as soon as the rotative pressure exerted by the fingers exceeds the resilient retaining force exerted by the detent spring 32 on ring 16. It will be understood that the operation of the mechanism during a right turn is identical with the foregoing description, except in the reverse sense.

Figure 4:
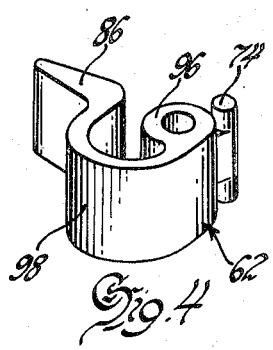
Fig. 4 is an enlarged perspective view illustrating the configuration of the cancelling pawls.
Figure 5:
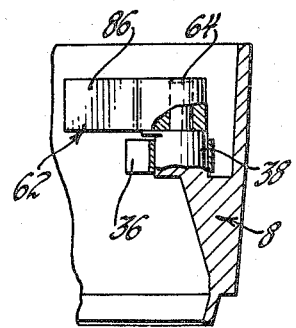
Fig. 5 is a fragmentary sectional elevational view of a portion of the mechanism looking in the direction of arrows 5—5 of Fig. 1.

In the event that the handle 24 is forcibly retained against the normal cancelling action of the pawls 60 or 62, or the mechanism is in some other way obstructed from normal operation, the pawls 60 and 62 are formed and arranged in a manner permitting overriding of a normal cancelling action without damage to the mechanism. As seen best in Fig. 4, the pawls 60 and 62 are formed with a relatively rigid hub portion 96 and a wedge-shaped terminal portion 86 which are connected by a relatively thin curved intermediate flexible wall portion 98 which is capable of limited distortion. Therefore, when the mechanism is jammed or restrained in an operating position such as shown in Fig. 3, cancelling pressure exerted on the tip of wedge-shaped portion 86 by either cancelling finger 88 or 90 causes the portion to act as a lever fulcrumed at pin 80. The lever action of portion 86 causes the intermediate portion 98 to distort sufficiently to permit the cancelling finger to pass the terminal extremity of the wedge-shaped portion. As soon as the finger clears the tip 86 of the pawl, the intermediate portion 98 will, of course, resume its normal curved configuration, causing the wedge-shaped portion to again occupy a position intersecting the circular path of the cancelling fingers. The mechanism will accordingly function normally as soon as the obstruction or restraint is removed.

While but one embodiment of the invention has been shown and described, it will be apparent that other changes and modifications may be made therein. It is, therefore, to be understood that it is not intended to limit the invention to the embodiment shown but only by the scope of the claims which follow.

I claim:

1. A direction signal switch operating mechanism comprising a housing, a ring pivotally mounted in said housing for movement from a neutral position to operating positions at opposite sides of said neutral position, a pair of flexible pawls pivotally and directly mounted on said housing, cam means movable in a circular path, and means carried by said ring for rotatably positioning said pawls for engagement by said cam means.

2. A direction signal switch operating mechanism comprising a housing, an operating ring pivotally mounted in said housing for movement from a neutral position to operating positions at opposite sides of said neutral position, a cam movable in a circular path, a pair of pawls pivotally and directly mounted at spaced points on said housing, resilient means urging said pawls to positions clearing the path of said cam, and means carried by said ring for rotating either of said pawls to cam engaging position.

3. A direction signal switch operating mechanism comprising a housing, an operating ring pivotally mounted in said housing at one side thereof, said ring being movable from a neutral position to switch operating positions at opposite sides of said neutral position, detent means for resiliently maintaining said ring in any of said positions, oppositely disposed pawls pivotally and directly mounted on said housing at spaced fixed points, resilient means interconnecting said pawls and rotatably urging the same in opposite directions, cam means movable in a circular path, and a pair of spaced projections on said ring engageable with said pawls, said projections being operative to rotatably position one of said pawls in the circular path of said cam means upon movement of said ring in one direction and to rotatably position the other of said pawls in said circular path upon movement of the ring in the opposite direction.

4. In a direction signal switch switch mechanism, a housing, an operating ring pivotally mounted in said housing at one side thereof for movement from a neutral position to positions at opposite sides of said neutral position, an electrical switch mounted in said housing, depending means formed on said ring and operatively engaging said switch, a pair of pawls pivotally and directly mounted on said housing at opposite sides thereof, a spring extending between said pawls and yieldably urging the same in opposite directions, a cam movable in a circular path, cam engaging means formed on said pawls, and means carried by said ring for rotating said pawls upon movement of said ring from the neutral position to cause said cam engaging means to intersect said circular path, said last mentioned means being responsive to rotation of said pawls in one direction to return said ring to the neutral position.

5. In a direction signal switch mechanism, a housing, an operating ring pivotally mounted in said housing at one side thereof, said ring being swingable from a central neutral position to operating positions at opposite sides of said neutral position, an electrical switch mounted in said housing, depending means formed on said ring and operatively engaging said switch, a pair of pawls pivotally mounted on said housing at opposite sides thereof, a coil spring extending between said pawls and yieldably urging the same in opposite directions, a cam movable in a circular path, cam engaging fingers formed on said pawls, and flexible portions on said pawls permitting angular deflection of said cam engaging fingers when said operating ring is restrained against return to neutral position.

6. In a direction signal switch mechanism, a housing, an operating ring pivotally mounted in said housing at one side thereof, said ring being swingable from a central neutral position to operating positions at opposite sides of said neutral position, an electrical switch mounted in said housing, depending means formed on said ring and operatively engaging said switch, a pair of pawls pivotally mounted on said housing at opposite sides thereof, a coil spring extending between said pawls and yieldably urging the same in opposite directions, a cam movable in a circular path, cam engaging fingers formed on said pawls, and flexible portions formed intermediately on said pawls permitting angular deflection of said cam engaging fingers when said operating ring is restrained against return to neutral position.

7. In a direction signal switch mechanism, a housing, an operating ring pivotally mounted in said housing at one side thereof, an electrical switch mounted in said housing, depending means formed on said ring and operatively engaging said switch, a pair of pawls pivotally mounted at opposite sides of said housing, a spring extending between said pawls and yieldably urging the same in opposite directions, a cancelling cam movable in a circular path, cam engaging lobes formed on said pawls, means carried by said ring for rotating said pawls against the urging of said spring to cause said lobes to intersect said circular path, said last mentioned means being responsive to rotation of said pawls in one direction to return said ring to the neutral position, and integral flexible portions on said pawls permitting angular deflection of said lobes by said cam when said ring is forcibly restrained against return to neutral position whereby the cancelling action of said cam may be overridden.

8. In a direction signal switch mechanism, a housing, an operating ring pivotally mounted in said housing at one side thereof, an electrical switch mounted in said housing, depending means formed on said ring, and operatively engaging said switch, a rotatable cancelling cam, a pair of pawls pivotally mounted at opposite sides of said housing, said pawls having elongated cam engaging fingers, a spring interconnecting said pawls and yieldably rotating the same in opposite directions against fixed stops, projecting means on said ring abuttingly engaging said fingers at one side theerof, said means being effective upon swingable movement of said ring to rotate said fingers in one direction for engagement by said cam, said projecting means being responsive to rotation of said pawls in the opposite direction to return said ring to the neutral position, and cam overriding means on said pawls, said last mentioned means comprising curved flexible intermediate portions permitting angular deflection of said cam engaging fingers when said ring is forcibly restrained against return to neutral position.

9. A direction signal switch operating mechanism comprising a housing, an operating ring disposed concentrically of said housing and pivotally connected thereto at one side thereof for swingable movement from a central neutral position to operating positions at opposite sides of said neutral position, detent means for yieldably restraining said ring in said positions, a cancelling cam rotatable in a circular path, oppositely disposed pawls pivotally and directly secured on said housing at fixed points on opposite sides of said housing, means forming cam engaging portions on said pawls, resilient means interconnecting said pawls and rotatively urging the latter in the opposite directions to normally position said cam engaging portions exteriorly of said circular path, stop means on said housing for limiting rotation of said pawls responsive to said resilient means, and means movable with said ring for rotating said pawls against the resistance of said spring to position said cam engaging portions in said circular path for engagement by said cam.

References Cited in the file of this patent
UNITED STATES PATENTS

| | | |
|---|---|---|
| 2,249,120 | Doane | July 15, 1941 |
| 2,276,413 | Moore | Mar. 17, 1942 |
| 2,617,902 | Lincoln et al. | Nov. 11, 1952 |
| 2,691,704 | Lincoln et al. | Oct. 12, 1954 |
| 2,725,435 | Cislo | Nov. 29, 1955 |
| 2,757,250 | Brown et al. | July 31, 1956 |

FOREIGN PATENTS

| | | |
|---|---|---|
| 150,932 | Australia | Apr. 16, 1953 |